July 1, 1969 J. M. KIRSHNER ET AL 3,452,771

TEMPERATURE INSENSITIVE FLUID OSCILLATOR

Filed Sept. 26, 1966

INVENTORS
JOSEPH M. KIRSHNER
CARL J. CAMPAGNUOLO
BY Harry M. Saragovitz,
Edward J. Kelly, Herbert Berl
& J. D. Edgerton United States Patent Office 3,452,771
Patented July 1, 1969

3,452,771

TEMPERATURE INSENSITIVE FLUID OSCILLATOR

Joseph M. Kirshner, Bethesda, and Carl J. Campagnuolo, Chevy Chase, Md., assignors to the United States of America as represented by the Secretary of the Army Filed Sept. 26, 1966, Ser. No. 582,481
Int. Cl. F15c 1/08
U.S. Cl. 137—81.5 11 Claims

ABSTRACT OF THE DISCLOSURE

A temperature insensitive fluid oscillator having feedback channels of variable dimensions connected from the output channels to the control channels of the oscillator. Varying the dimensions of the feedback channels in accordance with a specified mathematical relationship for a given oscillator frequency, pressure and cross-sectional area, makes the oscillator temperature insensitive.

This invention relates to the pure fluid arts and in particular to a pure fluid oscillator which has a frequency substantially insensitive to changes in temperature.

There are many types of oscillators in existence today. Electrical and mechanical oscillators are, of course, among the most well known. However, there are inherent disadvantages in each type of oscillator which limits their applicability. Mechanical oscillators require moving parts in order to achieve an oscillatory output. Wear, friction and thermal expansion adversely affect the reliability of these devices thus limiting their use. Electrical oscillators have the inherent disadvantage of requiring a substantially vibration free environment which, in certain situations, may be extremely difficult to obtain.

Pure fluid oscillators have only recently been invented and because of their lack of moving parts and inherent simplicity have been replacing mechanical and electrical oscillators in certain applications. The typical fluid oscillator comprises a main fluid nozzle extending into an interaction chamber. Adjacent the main fluid nozzle are two sidewalls (hereinafter referred to as the left and right sidewalls) which along with a splitter positioned opposite the main fluid nozzle define a left and right outlet channel. Left and right control orifices extend through the left and right side-walls, respectively, and terminate in two control nozzles which have their centerlines passing orthogonally through the centerline of the main fluid nozzle. Left and right feedback channels connect the respective outlets with the responsive nozzles.

This type of oscillator has been found to be rugged and dependable in operation eliminating some of the above mentioned disadvantages of the prior art. However, none of the present fluid oscillators have been designed to make their frequency insensitive to temperature changes.

Frequency in a fluid oscillator is a function, in part, of pressure, temperature, feedback channel length and cross-sectional channel areas. Thus it can be seen that if the temperature of the fluid in the oscillator changes the frequency will also change. In certain environments small changes in oscillator frequency, because of temperature variations, can be disastrous and any fluid oscillator that can be substantially temperature insensitive would find a wide variety of uses.

This invention provides for a substantially temperature insensitive fluid oscillator thus overcoming basic disadvantages of prior art fluid oscillators.

It is therefore an object of the present invention to provide a fluid oscillator having a frequency substantially insensitive to temperature.

Further objects, features and advantages of the present invention will become apparent upon consideration of the following specification and drawing, wherein.

Figures 1, 3:
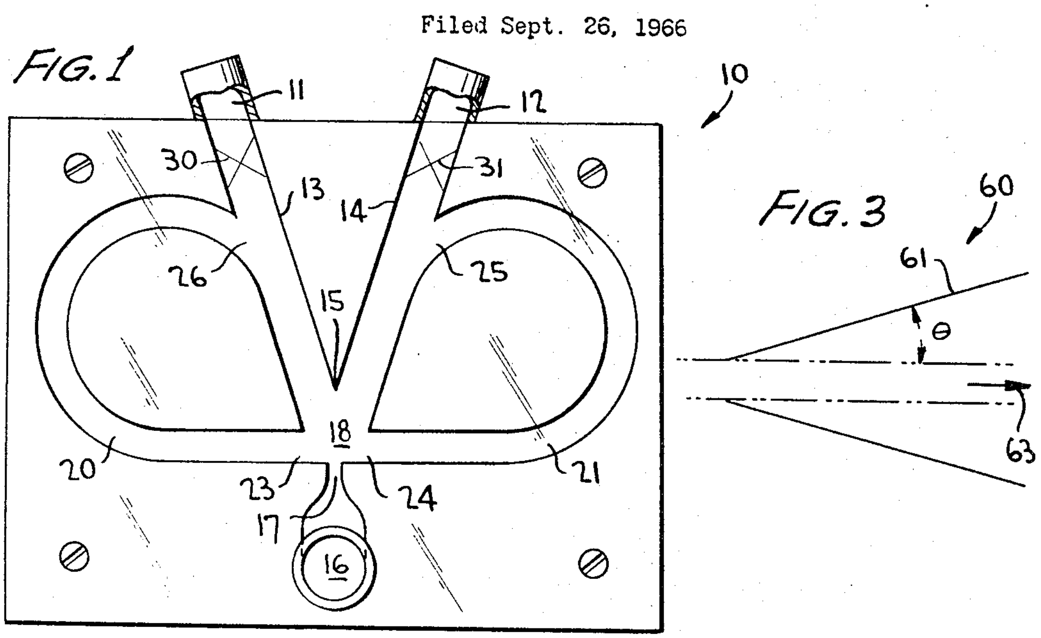
FIG. 1 is a schematic representation of a fluid oscillator in accordance with the present invention.
FIG. 3 is a schematic illustration in accordance with the present invention of another embodiment of the feedback channel of my invention.

In order to better undersand the design of a temperature insensitive fluid oscillator it will be necessary to review the theory of wave motion of fluid in a duct.

Although the speed of sound in free space is proportional to the square root of temperature, the complex speed of wave propagation in a duct is a function of distributed inertance, capacitance, and resistance.

The magnitude of the complex speed of wave propagation in a duct of constant cross-section is given approximately for small wave amplitudes by:

$$|c|^4=\frac{a^4}{1+\frac{R^2}{\omega^2L^2}} \tag{1}$$

where $c$=complex speed of wave propagation
$a$=free speed of sound, proportional to $T^{1/2}$
T=temperature
R=resistance per unit length of duct
$\omega$=angular frequency
L=inertance per unit length R and L in turn are given for a circular duct by $$R\cong\frac{8\pi\mu}{A^2}$$

$$L=\frac{\rho}{A}$$

where $\mu$=viscosity, approximately proportional to $T^{3/4}$
A=area of the duct
$\rho$=density of the fluid used The density ($\rho$) of the gas can be computed by the ideal gas law as follows:

$$\rho=\frac{p}{R_gT}$$

where

P=the pressure of the fluid, and
$R_g$=the gas constant for the particular fluid.

Redefining the complex speed of wave propagation ($|c|$) in terms of temperature the following equation is obtained:

$$|c|^4=\frac{a_1}{\frac{1}{T^2}+\frac{a^2T^{3/2}}{\omega^2A^2p^2}} \tag{2}$$

where $a_1$ and $a_2$ are constants.

An inspection of Equation 2 shows that for $T=0$ and for $T\rightarrow\infty$, $|c|=0$, thus $|c|$ must have a maximum value at a temperature between $T=0$ and $T\rightarrow\infty$. Hence, the complex speed of wave propagation ($|c|$) should be least sensitive to temperature in vicinity of the maximum because the slope of a complex speed of wave propagation vs temperature curve will be a minimum in this region.

It therefore follows that if the complex speed of wave propagation is temperature insensitive the frequency will be temperature insensitive since $$\omega=\frac{2\pi|c|}{l} \quad (3)$$

where $l$ is the path length and $\omega$ is the frequency.

Referring to Equation 2 it can readily be seen that the complex speed of wave propagation ($|c|$) is a maximum when the denominator (D) of the equation is a minimum. Differentiating the denominator (D) and setting it equal to zero, as performed below, will give a temperature ($T_M$) at which the magnitude of the complex speed of wave propagation will be a maximum for a given frequency ($\omega$), a given pressure (P), and a given cross-sectional area (A).

Performing the following algebra:

$$D=\frac{1}{T^2}+\frac{a^2T^{3/2}}{\omega^2A^2p^2}$$

$$\frac{dD}{dT}=-\frac{2}{T^3}+\frac{3a_2T^{1/2}}{2\omega^2A^2p^2}$$

Setting this equal to zero, $$T_m=\left(\frac{4\omega^2A^2p^2}{3a_2}\right)^{2/7} \quad (4)$$

The procedure for making the oscillator insensitive to temperature in the vicinity of a given temperature T is to let $T=T_m$ of Equation 4. This determines the value of $\omega$A for a system pressure ($p$). For a given A, this therefore specifies $\omega$. From Equation 2, $|c|$ is then given. Finally Equation 3 is used to specify $l$.

The temperature insensitive range may not be sufficient for the application and can be increased by the following method.

Let $l=l_1, l_2 \ldots$ where $l_1$ is the length of one segment of the feedback channel, etc.

From Equation 2 and 3 the following result is obtained:

$$\left(\frac{\omega l}{2\pi}\right)^4=|c|^4=\frac{a_1}{\frac{1}{T^2}+\frac{a_2T^{3/2}}{\omega^2A^2p^2}}$$

or $$\omega^2=-\frac{a_2T^{7/2}}{2A^2p^2}+\frac{1}{2}\sqrt{\frac{a_2^2T^7}{A^4p^4}+\frac{4a_1(2\pi)^4T^2}{l^4}} \quad (6)$$

From Equation 6 for the desired frequency ($\omega$), the given feedback channel segment length ($l_1$), the system pressure ($p$) and the selected temperature (T), the cross-sectional area of the duct (A) can be determined. In designing a temperature insensitive oscillator using this method the following steps are necessary.

(1) Select the desired overall feedback length.

(2) Select the desired length of each segment of the feedback channel.

(3) Select the angular frequency for the oscillator consistent with steps 1 and 2 and select the system pressure.

(4) Select a temperature which is in the region the oscillator is to be insensitive for.

(5) From this information use Equation 6 to determine the cross-sectional area of the particular segment.

(6) For a second segment perform the same steps but selecting a different temperature. This temperature would also be one where it is desired that the oscillator will be temperature insensitive.

(7) Repeat as necessary to cover the range of temperature that is desired the oscillator be insensitive for.

It can readily be seen that for a given frequency, the complex speed of wave propagation reaches a maximum at a slightly different temperature for each segment of the feedback channel because of the different cross-sectional areas of each segment. This has the effect of increasing the temperature insensitive region for a complex wave over a feedback channel length and thus increasing the insensitivity of the frequency. Of course, a conduit of continually varying cross-sectional area could be used also.

Equation 6 shows that the oscillator may under certain conditions be forced to oscillate at a frequency approximately proportional to the pressure. To do this, it is only necessary to choose the length ($l$), the cross-sectional area (A) and the pressure (P) so that the second term under the radical of Equation 6 is small compared to the first term, in which case:

$$\omega^2\cong-\frac{a_2T^{7/2}}{2A^2p^2}+\frac{a_2T^{7/2}}{2A^2p^2}\left[1+\frac{2(2\pi)^4a_1A^4p^4}{l^4a_2^2T^5}\right] \quad (7)$$

whence $$\omega\cong\frac{(2\pi)^2Aa_1^{1/2}}{l^2T^{3/4}a_2^{1/2}}p \quad (8)$$

which is the relation for a pressure-controlled oscillator. For maximum sensitivity the co-efficient of $p$ in Equation 7 should be made as large as possible but with the restriction that the second term under the radical of Equation 6 remain small compared with the first term. Since $l$ and A enter Equation 6 as terms of the fourth degree but A is only of the first degree in Equation 7, whereas $l$ is of the second degree, it follows that a reduction of $l$ keeping the ratio of $A/l$ constant will result in a larger coefficient of $p$ without a change in the accuracy of the approximation.

In FIG. 1, an oscillator 10 has output channels 11 and 12. Output channel 11 is formed in part by a side wall 13 while output channel 12 is formed in part by a side wall 14. Side walls 13 and 14 form a V and meet at splitter 15. Power is supplied to oscillator 10 by a source 16 which communicates with an interaction chamber 18 by a power nozzle 17. Each output channel communicates with the interaction chamber 18. A left control port 23 and a right control port 24 are opposite each other and adjacent nozzle 17. A left feedback port 26 communicates with output channel 11 downstream of interaction chamber 18 and communicates with left control port 23 by a left feedback channel 20 which is of constant cross-sectional area. A right feedback channel 21 of constant cross-sectional area communicates with a right feedback port 25 and a right control port 24. Adjustable resistances 30, 31 are present in each output channel to help tune the oscillator by controlling the pressure therein. In the embodiment of FIG. 1 the length of feedback channels 20 and 21 are for a given frequency, pressure and cross-sectional area determined from Equations 2, 3, and 4 to provide a substantially temperature insensitive oscillator.

Figure 2:
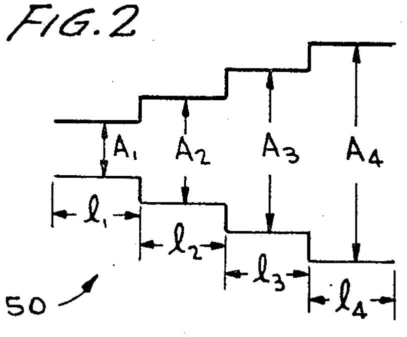
FIG. 2 is a schematic representation in accordance with the present invention of a feedback channel of my oscillator.

In FIG. 2 a cross-sectional view of a feedback channel 50 is illustrated. In this embodiment of the invention the length of the feedback channel is broken up into segments $l_1, l_2 \ldots$ with the entire length of the feedback channel being equal to the sum of the particular segments. Each segment $l_1, l_2 \ldots$ has a cross-sectional area $A_1$, $A_2 \ldots$ different from the next cross-sectional area and for equal segment lengths the areas of each segment will increase in size from the feedback port to the control port along the length of the feedback channel. The areas of the feedback channels can be computed as previously described.

In FIG. 3, a diverging duct 60 is shown which is formed by wall 61. The wall 61 forms an angle $\theta$ with a horizontal datum which is a measurement of the divergence of the duct. The diverging duct can be used in place of segmented feedback channels as it is of simplier construction.

Figure 4:
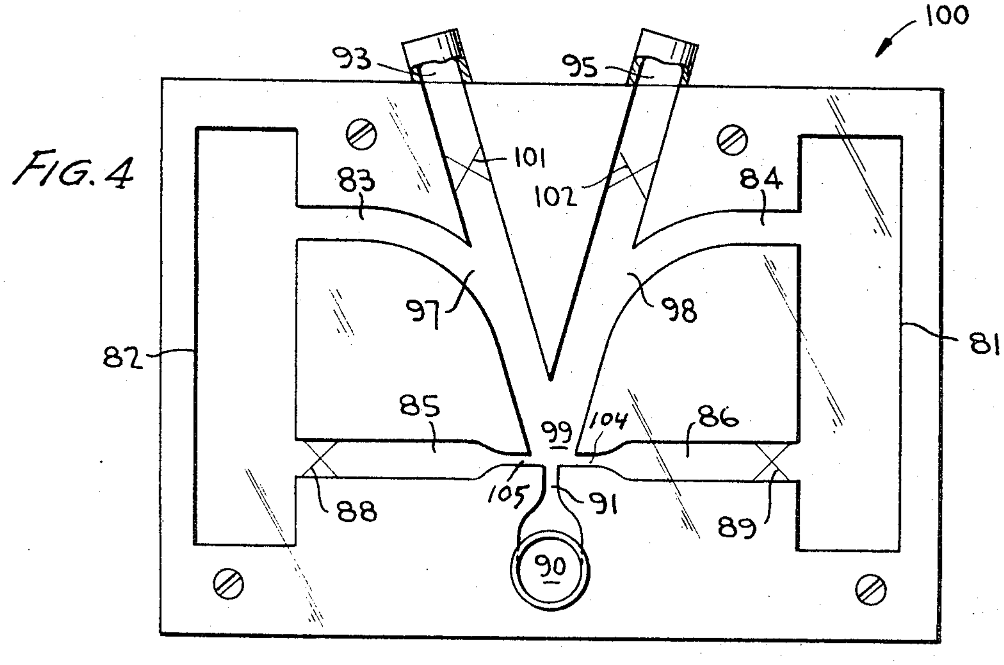
FIG. 4 is a schematic representation of an alternate embodiment of an oscillator which is temperature insensitive.

In FIG. 4, an oscillator 100 is designed as a lumped parameter circuit. A left output channel 93 communicates with a left fluid capacitance 82 by a port 97 and a conduit 83, while a right output channel 95 communicates with a right fluid capacitance 81 by a port 98 and a conduit 84. Left capacitance 82 communicates with an interaction chamber 99 of oscillator 100 by conduit 85 and control nozzle 105, while right capacitance 81 communicates with interaction chamber 99 by a conduit 86 and control nozzle 104. Conduit 85 has a variable resistance 88 in it while conduit 86 has a variable resistance 89 in it. Variable resistors 101 and 102 are in the respective output channels to vary the load therein.

In the temperature insensitive oscillator of FIG. 1 and the embodiments of FIGS. 2 and 3, we have relied on distributed parameters. In these embodiments a certain length of channel was used having a particular fluid capacitance and resistance. In FIG. 4, these distributed parameters have been lumped. The total fluid capacitance of the various channels of FIGS. 1, 2, and 3 have been replaced by one fluid capacitance, while the various resistances of each segment of feedback channel have been replaced by one variable resistance producing the same circuit mathematically only with different elements.

The oscillator 100 can be tuned by varying resistances 88 and 89 until a temperature insensitive region is obtained.

Experimental tests have been run using oscillators built in accordance with the present invention. An oscillator having a constant cross-sectional area was tested and for a pressure (P) of 50 p.s.i.g., a length ($l$) of 12″, an inside feedbck channel diameter of .027″, a frequency ($\omega$) of 370 c.p.s. was obtained which did not appreciably vary from 100° F. to 250° F. The temperature insensitive range was greater than expected because of mach number affects in the feedback line which make the temperature and pressure both functions of position. A greater temperature insensitive region would be obtained if the feedback channel was of varying cross-sectional areas in accordance with the present invention. Obviously the oscillator could be designed to be insensitive for other temperature regions in accordance with the principles set forth in the present invention.

In summary it can readily be seen that we have provided various methods to make a fluid oscillator temperature insensitive thus overcoming prior art deficiencies.

We claim as our invention:

1. A substantially temperature insensitive fluid oscillator comprising:
(a) means to issue a power fluid,
(b) plural power receiving means to receive said power fluid,
(c) control means adjacent said means to issue said power fluid to direct said power fluid to said power receiving means,
(d) a feedback channel communicating said power receiving means and said control means,
(e) the length of said feedback channel being equal to:

$$l=\frac{2\pi}{\omega}\left(\frac{\gamma^2R_g^2}{\frac{1}{T^2}+\frac{64\pi c^2T^{3/2}\rho^2}{A^2\omega}}\right)^{1/4}$$

where $\omega$=the chosen frequency
T=temperature
$\gamma$=a gas constant
$R_g$=a gas constant
$\rho$=system pressure
$c$=viscosity/$T^{3/4}$
A=area of channel and $$T=\left[\frac{4\omega^2A^2\rho^2}{(3)\left(\frac{64\pi^2c^2}{R_g^2}\right)}\right]^{2/7}$$

2. A temperature insensitive fluid oscillator comprising:
(a) means for generating a fluid stream,
(b) further means responsive to said fluid stream for oscillating said fluid stream in different directions at a particular frequency,
(c) said further means including means to keep said frequency substantially temperature insensitive.

3. A device according to claim 2 wherein said feedback means to render said frequency substantially temperature insensitive includes a feedback channel having a varying cross-sectional area.

4. A device according to claim 2 wherein said feedback means to render said frequency substantially temperature insensitive includes a feedback channel formed by a plurality of segments, each of said segments having a different cross-sectional area.

5. A device according to claim 2 wherein said feedback means to render said frequency substantially temperature insensitive comprises a diverging feedback channel.

6. A device according to claim 2 wherein said feedback means to render said frequency temperature insensitive includes a fluid capacitance.

7. A device according to claim 6 wherein said feedback means further includes a variable resistance in series with said fluid capacitance.

8. An oscillator comprising:
(a) means to issue a power fluid,
(b) output means to receive said power fluid,
(c) a feedback channel of varying cross-sectional area to utilize a portion of said power fluid directed to said output means to oscillate said power fluid at a frequency substantially insensitive to temperature.

9. An oscillator according to claim 8 wherein said feedback channel comprises a plurality of segments each having a different cross-sectional area.

10. An oscillator according to claim 8 wherein said feedback channel comprises a diverging duct.

11. A temperature insensitive oscillator comprising:
(a) means to receive a fluid under pressure,
(b) means to oscillate said fluid at a particular frequency, and
(c) means to render said frequency proportional linearly to pressure changes and substantially insensitive to temperature changes.

References Cited

UNITED STATES PATENTS

| | | | |
|---|---|---|---|
| 3,158,166 | 11/1964 | Warren | 137—81.5 |
| 3,159,168 | 12/1964 | Reader | 137—81.5 |
| 3,185,166 | 5/1965 | Horton et al. | 137—81.5 |
| 3,223,101 | 12/1965 | Bowles | 137—81.5 |
| 3,228,410 | 1/1966 | Warren et al. | 137—81.5 |

FOREIGN PATENTS 1,278,781 11/1961 France.

SAMUEL SCOTT, *Primary Examiner.*